ns
3,466,880
SUBMERSIBLE CHAMBER FOR SUBMERGED
PIPELINES
Hartwell A. Elliott, Box 5512, Drew Station,
Lake Charles, La. 70601
Filed Apr. 28, 1967, Ser. No. 634,751
Int. Cl. B63c 11/38, 11/40; F16l 55/00
U.S. Cl. 61—63                                          4 Claims

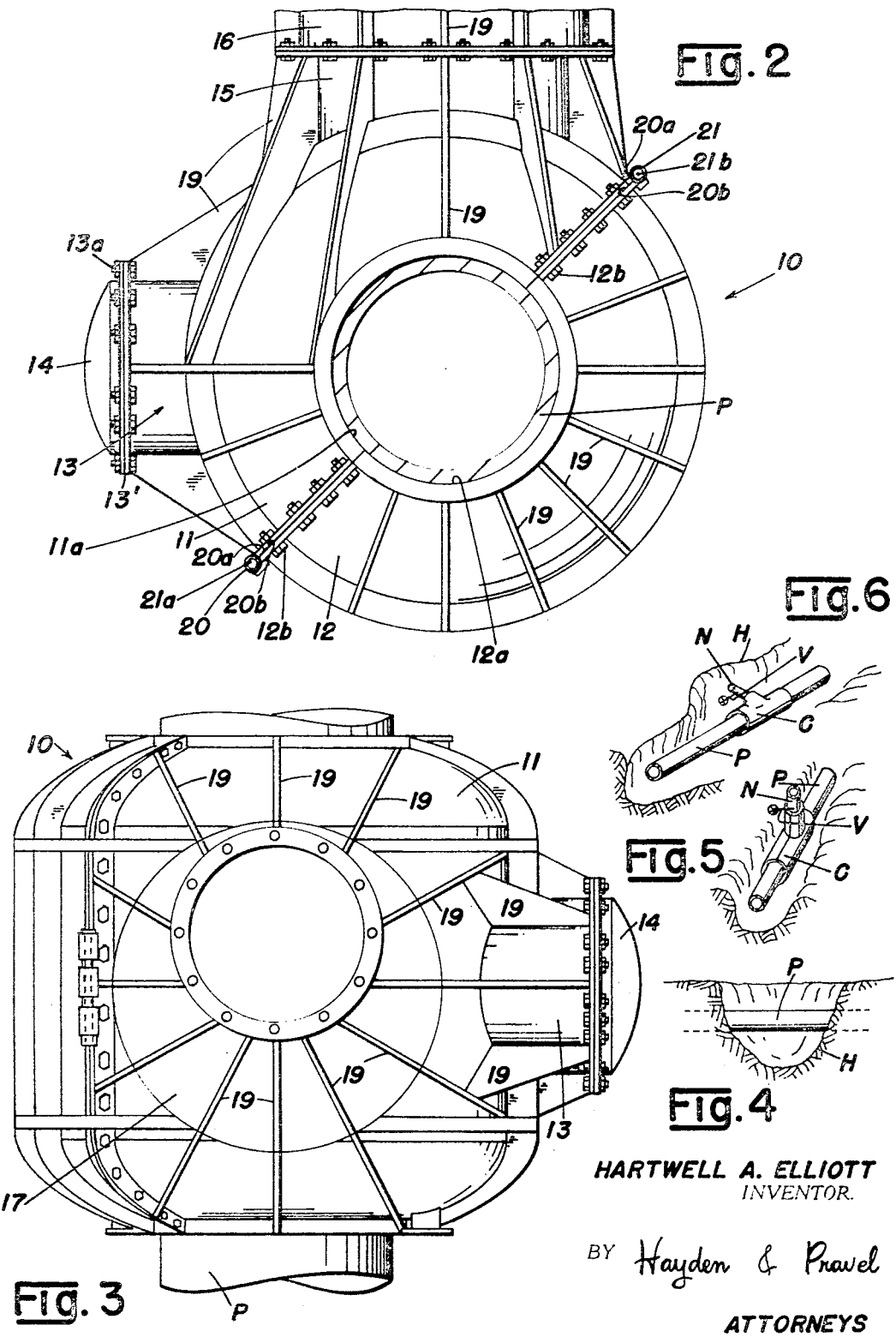

ABSTRACT OF THE DISCLOSURE

A sumersible chamber for repair of pipelines in water, formed by two mating hollow portions. One portion having a working structure projecting therefrom and an access structure preferably at a right angle to the working structure, and an access tube for connecting with the working structure or the access structure and extending above the surface of the water. Each of the mating portions have diametrically opposed semicircular openings for receiving a pipe line therethrough with the mating portions being pivotally connected by hinge means which include removable pins along one edge of the working structure and along one edge of the access structure whereby the second portion may freely swing away from the first portions.

BACKGROUND OF THE INVENTION

Field of the invention

The invention relates generally to submarine repair, modification, or construction and in particular to a submersible chamber for such activities.

Underwater pipelines frequently require repair, modification, or reconstruction and the submersible chamber of the present invention is especially adapted to be lowered into the water to provide a waterless working area for effecting such repair or reconstruction.

Description of the prior art

It has become relatively common to lay large gas pipelines, conduits, or the like on the bottoms of or submerged in the bottoms of large bodies of water. The pipeline or conduit is usually laid in a trench formed in the water covered land and buried to prevent it from being disturbed or displaced.

After the pipeline has been set in place, it may thereafter become necessary or desirable to repair, modify, or reconstruct the pipeline. For example, a break requiring repair may develop in the line or it may become desirable to tie into the line with another pipeline or place a valve in the pipeline or conduit. Such repair, modification, or reconstruction of an in place line has usually required that the line be uncovered and lifted to the water's surface. When such a procedure is employed with the larger pipelines, many cooperating surface vessels are required to simultaneously lift the pipeline at various points along its length. If water conditions are unfavorable, the pipeline cannot be lifted by this procedure, or if conditions become unfavorable, it must be relowered and then relifted when conditions are favorable.

As an alternative to lifting the pipeline to the water surface, it is sometimes possible to accomplish the desired repair, modification, or reconstruction by in place procedures. Such in place procedure is usually effected by uncovering the desired section of the pipeline and employing divers using special underwater tools. This latter procedure has many disadvantages. Muddy or rough water often prevents the use of procedure altogether. Divers generally do not possess the necessary skills required for such repair and their diving gear makes movement awkward. A further limitation is imposed by the relatively short period of time during which the diver may safely remain at greater depths and the need for decompression procedures before returning the diver to the surface.

Diving bells or other pressurized devices may be employed in certain repairs, but again this procedure too presents certain disadvantages. The occupants of the diving bell must frequently be returned to the surface because of the high pressures in the bell. Work under such conditions is fatiguing and cannot be endured for extended periods. Each return requires a decompression period and an attendant loss of time.

Some of the problems detailed above as well as others not discussed have been solved by employing a waterproof closed chamber which surrounds the pipeline section. The chamber is maintained at atmospheric pressure by an access tube or the like extending to the water's surface. Certain definite advantages exist in such a device. For example, workmen may quickly and easily enter and leave the chamber through the access tube. Moreover, the workmen may work continually within the chamber with conventional tools and procedures which would not be usable by divers or within diving bells or the like.

One of the problems inherent in the use of such a waterproof chamber is the difficulty in keeping the chamber submerged. Certain tools required in the repair and reconstruction procedures require ample working room. However, as the size of the chamber is increased to accommodate such tools, the chamber becomes more buoyant and its in place stability is impaired. Also, as the chamber becomes larger, it is necessary to remove greater quantities of the dirt and mud from around the pipeline before the chamber can be positioned about the pipeline. Additionally, present devices are not generally constructed to enable them to assume any one of several desired positions to accommodate workmen or equipment.

SUMMARY OF THE INVENTION

The invention comprises a segmented, waterproof, submersible compartment which may quickly and easily be positioned about a submerged pipeline or conduit. The configuration and structure of the chamber or compartment make it highly versatile, and its relative small size reduces buoyancy forces which might otherwise impair stability of the submerged chamber. The chamber preferably includes two segments or portions that are hingedly secured together on each side to enable either portion to swing away from the other when the connecting hinge pin is removed. One of the portions includes an access structure and a working structure. A working chamber or jug may be secured to the working structure and an access tube may be secured to the working structure or to the access structure, depending upon the use to which the submersible compartment is to be put. The access tube, in either position, extends above the surface of the water so that personnel may work at atmospheric conditions. The working chamber or jug provides a lateral extension of sufficient size so that it accommodates personnel or special equipment which may be required, including special elongate equipment.

Where the invention is used in depths that preclude the use of an access tube because of its length and bulkiness in handling, the chamber can still be positioned around the pipeline, or the like, and men and equipment lowered in a capsule, and the capsule connected with the chamber to allow men and equipment to enter or leave the chamber. Even under these conditions, the chamber walls be be thick enough to withstand the pressure and a fume or exhaust discharge hose and an air supply hose from the surface still permit the men to work at substantially atmospheric pressure.

BRIEF DESCRIPTION OF THE DRAWINGS

FIG. 2 is a partial elevation of the submersible chamber of the present invention taken along the line 2—2 of FIG. 1;

FIG. 3 is a plan view of the submersible chamber of the present invention taken along the line 3—3 of FIG. 1;

FIG. 4 is a partial diagrammatic illustration of the bottom in a water covered area illustrating a section of pipeline after it has been uncovered for the application of the submersible chamber of the present invention;

FIG. 5 is a partial diagrammatic view illustrating a section of pipeline after having a vertical tap or modification applied with the aid of the submersible chamber of the present invention; and FIG. 6 is a partial diagrammatic view illustrating a section of pipeline after having horizontaal tap or modification applied to a pipeline with the aid of the submersible chamber of the present invention.

DESCRIPTION OF THE PREFERRED EMBODIMENT

Structure of the invention

Figure 1:
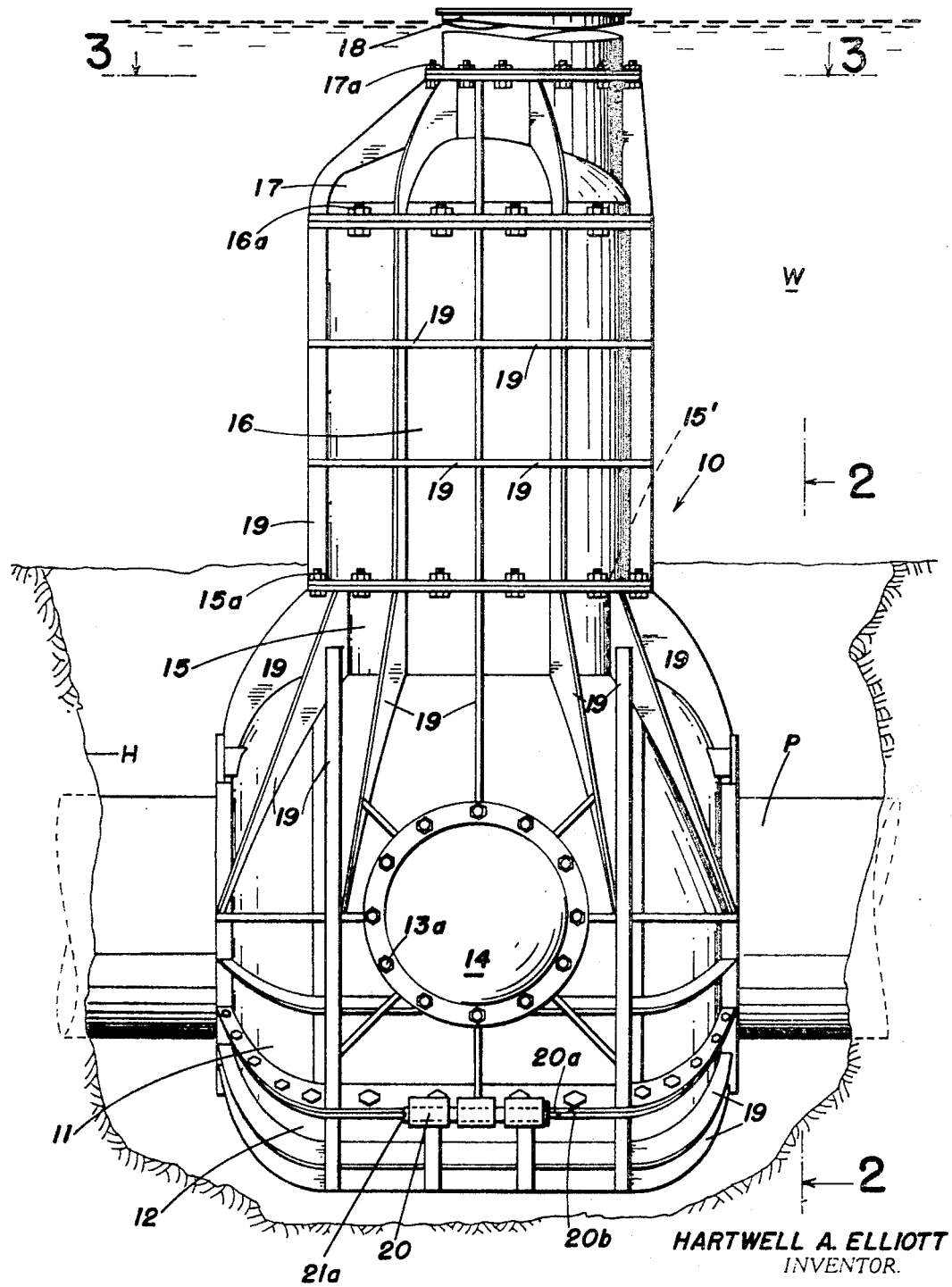
FIG. 1 of the drawings is an elevation of a form of the submersible chamber of the present invention illustrated in position in an excavation about a section of submerged pipeline in a water covered area as it would be disposed for making a vertical tap, modification, or repair in the pipeline.

The invention will be described in detail where the depth at which it is to be used enables the use of an access tube; however, this is not to be construed as limiting since the invention may be employed in depths that would preclude the use of an access tube and egress and ingress of men and equipment to the invention would then be by capsule, as previously noted, and an exhaust line and an air intake from the surface to the invention would enable the men to work at substantially atmospheric pressure. The invention is made of material of suitable thickness to withstand the pressure of the surrounding body of water under these conditions. The manner of lowering the men and equipment to the invention when it is at depths that preclude the use of the access tube is accomplished by means well known in the art.

The submersible chamber of the present invention is indicated generally by reference numeral 10 in FIGS. 1, 2, and 3. As best seen in FIG. 2, the chamber 10 includes two mating portions or segments 11 and 12, preferably generally hemispherical in shape; however, the chamber is not limited to such shape. Each of the portions 11 and 12 is provided with diametrically opposed semicircular openings 11a and 12a, respectively. The two portions 11 and 12 are held together by suitable means such as nuts and bolts 12b. The openings 11a and 12a co-operate to form circular openings through which a pipeline P may pass, as shown in FIG. 2. The openings 11a and 12a are formed to receive adapter elements and a sealing gasket as disclosed in my prior Patent No. 2,812,641 for forming a seal with various size pipeline or conduit.

The portion 11 is provided with an access structure represented generally at 13 that provides a circular opening 13' at its outer end which communicates with the interior of the portion 11 and to which an access tube (not illustrated) may be affixed when a horizontal tap or modification is to be made in the pipeline P at depths where the access tube may be used. When the chamber 10 is rigged for a vertical tap or modification in the submerged pipeline P, the opening 13' formed in access structure 13 is sealed off by a curved cover plate 14 connected to access structure 13 by suitable means such as bolts 13a, as better seen in FIG. 2.

As best illustrated in FIG. 1 of the drawings, a second or working structure 15 is also provided on portion 11 and forms a circular opening 15' that communicates with the interior of the portion 11. When a vertical tap or modification is to be made in the pipeline P, a working chamber or jug 16 which may be of any suitable diameter to conform with the diameter of opening 15' is affixed to the structure 15 by any suitable means such as nuts and bolts 15a. The top of the jug 16 is secured by nuts and bolts 16a to an adapter 17 which in turn is connected by nuts and bolts 17a to the lower end of an access tube 18. The access tube 18 projects above the surface of the body of water W to afford access to the interior of the chamber and to provide atmospheric conditions therein when the invention is used at depths to permit the use of the access tube. The portions 11 and 12 as well as the jug 16 and adapter 17 are reinforced for use at relatively great water pressures by suitably spaced ribs 19.

As best illustrated in FIGS. 1 and 2 of the drawings, hinges 20 and 21 are provided along a portion of the edges of mating surfaces 20a and 20b of each portion 11 and 12. Removable hinge pins 21a and 21b, respectively, are provided for fitting in the hinges 20 and 21 on the portions 11 and 12 for a purpose to be hereinafter described.

In using the present invention, the pipeline P will first be uncovered, as shown in FIG. 4 by any suitable means, which forms no part of the present invention. The form or shape of the excavation or hole H will depend upon whether the working chamber or jug 16 is to be positioned vertically or horizontally in the water covered area.

FIG. 5 is a diagrammatic illustration where a vertical tap or modification has been made in the pipeline or conduit P, and FIG. 4 shows the excavation and pipeline or conduit P where a horizontal tap or modification has been made therein.

If a veritcal tap or modification is to be made in the pipeline or conduit P, the chamber is rigged as illustrated in FIGS. 1, 2, and 3 of the drawings. The hinge pin 21a is removed from the hinge 20 and the nuts and bolts 12b which hold the two portions 11 and 12 together are also removed prior to lowering them into the water. With the hinge pin 21b and nuts and bolts 12b removed, the portion 12 is free to swing away from the portion 11 on the hinge 21. With the assistance of mechanical equipment on a barge or the like and with the assistance of divers, the portions 11 and 12 are then lowered into the water and into the hole H with the access tube 18, shown in FIG. 1, held in a vertical position in communication with the atmosphere above the surface of the water.

The portions 11 and 12 are swung open at the hinge 21 and closed about the pipeline P when they are both in position. The portions 11 and 12 when in closed position about the pipeline P completely encircle it and its extends through the circular openings formed by the co-operating semicircular openings 11a and 12a as illustrated in FIG. 2 of the drawings. If necessary, suitable adapters and seals are provided to form a watertight seal with the pipeline as discussed in my Patent No. 2,812,641. The nuts and bolts 12b are replaced to draw the two portions together to form a watertight seal along their contacting surfaces. Any further leaks between the openings 11a and 12a and the pipeline P or the contacting surfaces of the portions 11 and 12 are sealed in any conventional manner and the interior of the chamber is then pumped free of water.

Workmen may enter the evacuated chamber by descending through the access tube 18 which communicates with the atmosphere above the water surface when the invention is used at depths to accommodate the access tube. A ladder or other means (not shown) may be provided in the access tube 18 to facilitate such movement through the tube. As will be explained, the chamber permits a vertical tap into the pipeline P to be made by workmen using only conventional surface tools and in a manner well known in the art. Thus, in a conventional tap, a nipple N, shown in FIGS. 5 and 6, having threads or other means of connection at one end is welded at its other end to the pipeline P. The integrity and strength of the weld is then tested by means well known. A segmented reinforcing T-collar such as the collar C illustrated in FIGS. 5 and 6 of the drawings is assembled about the pipeline section and the attached nipple. The T-collar is then welded to itself causing it to shrink tightly about the pipeline and the nipple. A valve V is then connected to the nipple in a manner well known in the art. The valve is opened and a special elongated drilling tool is inserted through the valve and the outermost end of the nipple until it abuts against the pipeline P. The drilling tool requires more space than is provided within the confines of the chamber, thus exemplifying one use of the working chamber or jug 16. The tool drills into the pipeline P, but the pressurized contents of the pipeline P are prevented from escaping by the presence of the tool itself within the valve V. The tool is then withdrawn to a position where the valve V may be closed to prevent escape of the contents of the pipeline P. The resultant vertical tap is illustrated in FIG. 5 of the drawings after the submersible chamber of the present invention has been removed.

The foregoing procedure is altered somewhat when a horizontal tap is to be made. As previously noted, for a horizontal tap, a hole H of a suitable shape is first cleared about the pipeline P as illustrated in FIGS. 4 and 6 of the drawings. However, the dimensions of the hole H must be adequate to receive the combined length of the portion 11, jug 16, and adapter 17 when they are horizontally disposed along the bottom of the hole H as diagramatically shown in FIG. 6. Also, prior to lowering the device, a suitable cover is bolted on the end of the adapter 17 to close it off. If desired, the cover plate 14 may be used for this purpose.

In assembling the chamber for a horizontal tap, the access tube 18 and cover plate 14 are removed and the access tube 18 is connected to the base structure 13 so that access to the interior of the invention 10 is provided through opening 13' when the invention is used at depths that permit the use of the access tube. The nuts and bolts 12b and hinge pin 21b are removed so that the two portions 11 and 12 are free to swing open and closed at the hinge 20. When the chamber is finally lowered and positioned about the pipeline P, the longitudinal axis of the jug 16 is horizontally disposed and the longitudinal aixs of the access tube 18 is vertically disposed. The two sections 11 and 12 are secured about the pipeline P as before described. It should be appreciated that the jug 16 is horizontally disposed to permit horizontal movement of the special drilling tool which is required for a horizontal tap or modification. The resulting horizontal tap is illustrated in FIG. 6 of the drawings after the invention 10 has been removed.

The disclosed structure is extremely versatile and may be assembled in any of several desired ways to serve any intended function. By way of example rather than limitation, the chamber may be assembled as illustrated in FIG. 1 of the drawings with the jug 16 being omitted. In this configuration, the adapter 17 would be connected directly to the base structure 15. Where special, elongated tools are not required, the jug 16 may be omitted with a corresponding reduction in unwanted buoyant forces.

It should be understood that many modifications may be made without departing from the scope and spirit of the invention. Thus, adjustable openings may be substituted for the openings 11a and 12a so that a great range of pipeline sizes may be accommodated without modification of the structure; the cover plate 14 may be replaced with a quickly removable hatch such as would be employed in submarines so that a diver could easily enter and leave the chamber when it is being used only as a protective shield or the like; the angle between the working tube and the access tube can be greater or less than 90° as desired; the mating sections may assume any shape and need not be hemispherical as disclosed; the pipeline P may pass through the chamber at any two points and need not be through diametrically disposed openings as disclosed; means other than bolts may be used to unite mating structures.

Similarly, it should also be appreciated that the chamber has a great range of applications. Thus, while vertical and horizontal taps were discussed in detail, it is apparent that repair, such as the cutting out of bad sections of pipeline and the welding in of new sections, may easily and quickly be effected by the use of the submersible chamber here described.

While only the preferred embodiment of the invention has been set forth for illustrative purposes, it should be understood that a great many variations may be made to the invention without departing from its spirit or scope.

I claim:
1. A submersible chamber for repair of pipelines and the ilke in water covered areas comprising:
   (a) first and second hollow mating portions;
   (b) said first portion having a working structure projecting therefrom;
   (c) an access tube secured to said first portion and extending above the surface of the water;
   (d) said mating portions having openings for receiving the pipeline; and
   (e) hinge means including removable pin means along one edge of said working structure and along one edge of said access structure so that said hinge means is offset relative to a vertical plane through the center of the chamber, whereby said second portion may freely swing away from said first portion when either of said pins is removed from its respective hinge means.
2. The chamber of claim 1 including a working jug connected to said working structure.
3. The chamber of claim 1 including adapter means for adapting said working jug to said access tube.
4. The chamber of claim 1 wherein said openings are formed by diametrically opopsed semicircular openings in each portion which form the openings for receiving a pipeline or the like when said portions are closed around a pipeline.

References Cited

UNITED STATES PATENTS

| | | | |
|---|---|---|---|
| 2,667,751 | 2/1954 | Osborn | 61—69 |
| 2,812,641 | 11/1957 | Elliott | 61—69 X |
| 2,939,292 | 6/1960 | Law | 61—72.3 X |
| 3,328,970 | 7/1967 | Giambelluca | 61—69 |

DAVID J. WILLIAMOWSKY, Primary Examiner

J. KARL BELL, Assistant Examiner

U.S. Cl. X.R.

61—69, 72.3